(12) United States Patent
Chang et al.

(10) Patent No.: US 8,512,084 B1
(45) Date of Patent: Aug. 20, 2013

(54) UNDERWATER THRUSTER

(75) Inventors: Nai-Jen Chang, Taichung (TW);
Shuo-Wen Chang, Taichung (TW);
Cheng-Chi Huang, Taichung (TW)

(73) Assignees: Nai-Jen Chang, Taichung (TW);
Shuo-Wen Chang, Taichung (TW)

( * ) Notice: Subject to any disclaimer, the term of this patent is extended or adjusted under 35 U.S.C. 154(b) by 0 days.

(21) Appl. No.: 13/476,306

(22) Filed: May 21, 2012

(51) Int. Cl.
*B63H 21/17* (2006.01)

(52) U.S. Cl.
USPC .............................................. 440/6

(58) Field of Classification Search
USPC ................. 114/312; 440/6; 417/410.1
See application file for complete search history.

(56) References Cited

U.S. PATENT DOCUMENTS

| | | |
|---|---|---|
| 3,765,185 A | 10/1973 | Peck et al. |
| 4,114,555 A | 9/1978 | O'Brien, Jr. |
| 2002/0083880 A1 | 7/2002 | Shelton et al. |

*Primary Examiner* — Stephen Avila
(74) *Attorney, Agent, or Firm* — Greenberg Traurig, LLP

(57) ABSTRACT

An underwater thruster includes a housing unit having a first opening, a cover unit connected to the housing unit and covering the first opening, a supporting unit connected to the housing unit, a motor having a driving shaft that extends through the first opening, a magnetic core unit connected to the driving shaft, a plurality of magnetic intermediate units disposed on the supporting unit and driven by the magnetic core unit, a magnetic surrounding unit driven by the magnetic intermediate units in a rotational speed smaller than the rotational speed of the magnetic core unit, and a propelling unit connected to the magnetic surrounding unit and having a plurality of angularly spaced-apart blades.

10 Claims, 5 Drawing Sheets

UNDERWATER THRUSTER

BACKGROUND OF THE INVENTION

1. Field of the Invention

The invention relates to a thruster, more particularly to an underwater thruster.

2. Description of the Related Art

The development of remotely operated vehicles (ROVs) and autonomous underwater vehicles (AUVs) have helped tremendously in marine exploration. Such vehicles are generally installed with miniaturized thrusters capable of high output torque, low noise generation, and overload protection.

A ROV disclosed in U.S. Patent Application No. US2002/0083880 includes an underwater thruster having a stator that is magnetically and rotatably coupled to a propeller of the ROV for driving rotation of the propeller. Through magnetically driving the propeller, the risk of overloading the thruster is reduced. However, the absence of a transmission reduction mechanism could lead to an insufficient output torque.

Underwater vehicles disclosed in U.S. Pat. Nos. 3,765,185 and 4,114,555 have thrusters cooperatively associated with reduction gear boxes of the underwater vehicles. Although such an arrangement may provide a high output torque, since the reduction gearboxes are physically coupled to the thrusters, the thrusters may overload when foreign objects are caught in the thrusters.

SUMMARY OF THE INVENTION

Therefore, the object of the present invention is to provide an underwater thruster having a transmission reduction mechanism and capable of overload protection.

Accordingly, an underwater thruster of the present invention comprises:

a housing unit defining a retaining space therein and having a first opening in spatial communication with the retaining space;

a cover unit connected water-tightly to the housing unit, covering the first opening, and defining a protective space therein that communicates spatially with the first opening;

a supporting unit connected to the housing unit and disposed in the protective space;

a motor disposed in the retaining space and having a driving shaft that extends through the first opening along an axis;

a magnetic core unit that is connected co-rotatably to the driving shaft and that extends along the axis into the protective space;

a plurality of magnetic intermediate units that are disposed on the supporting unit, that surround the magnetic core unit, and that are driven rotatably and magnetically by the magnetic core unit when the magnetic core unit rotates;

a magnetic surrounding unit that surrounds the cover unit, that is driven rotatably and magnetically by the magnetic intermediate units when the magnetic intermediate units rotate, and that has a rotational speed lower than that of the magnetic core unit; and a propelling unit connected co-rotatably to the magnetic surrounding unit, and having a plurality of angularly spaced-apart blades that surround the axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
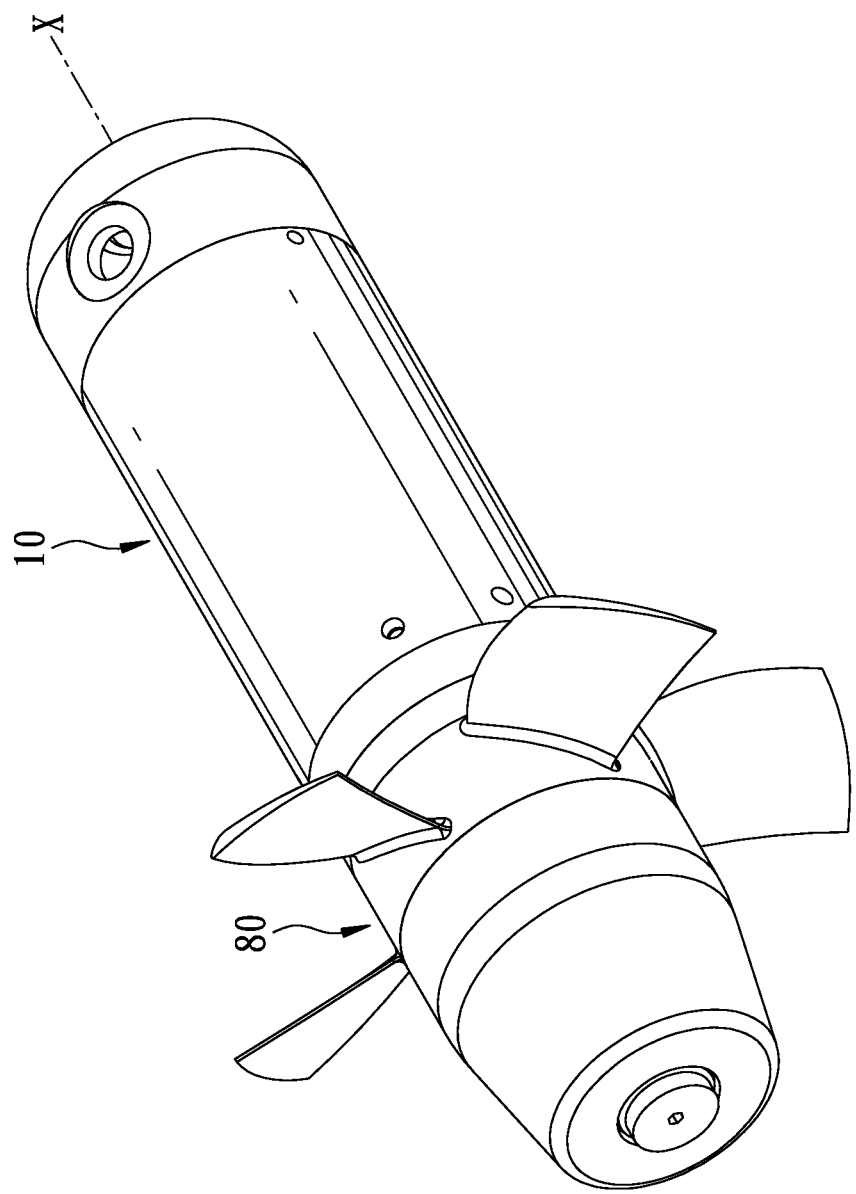
FIG. 1 is an assembled perspective view of a preferred embodiment of an underwater thruster according to the invention.
Figure 2:
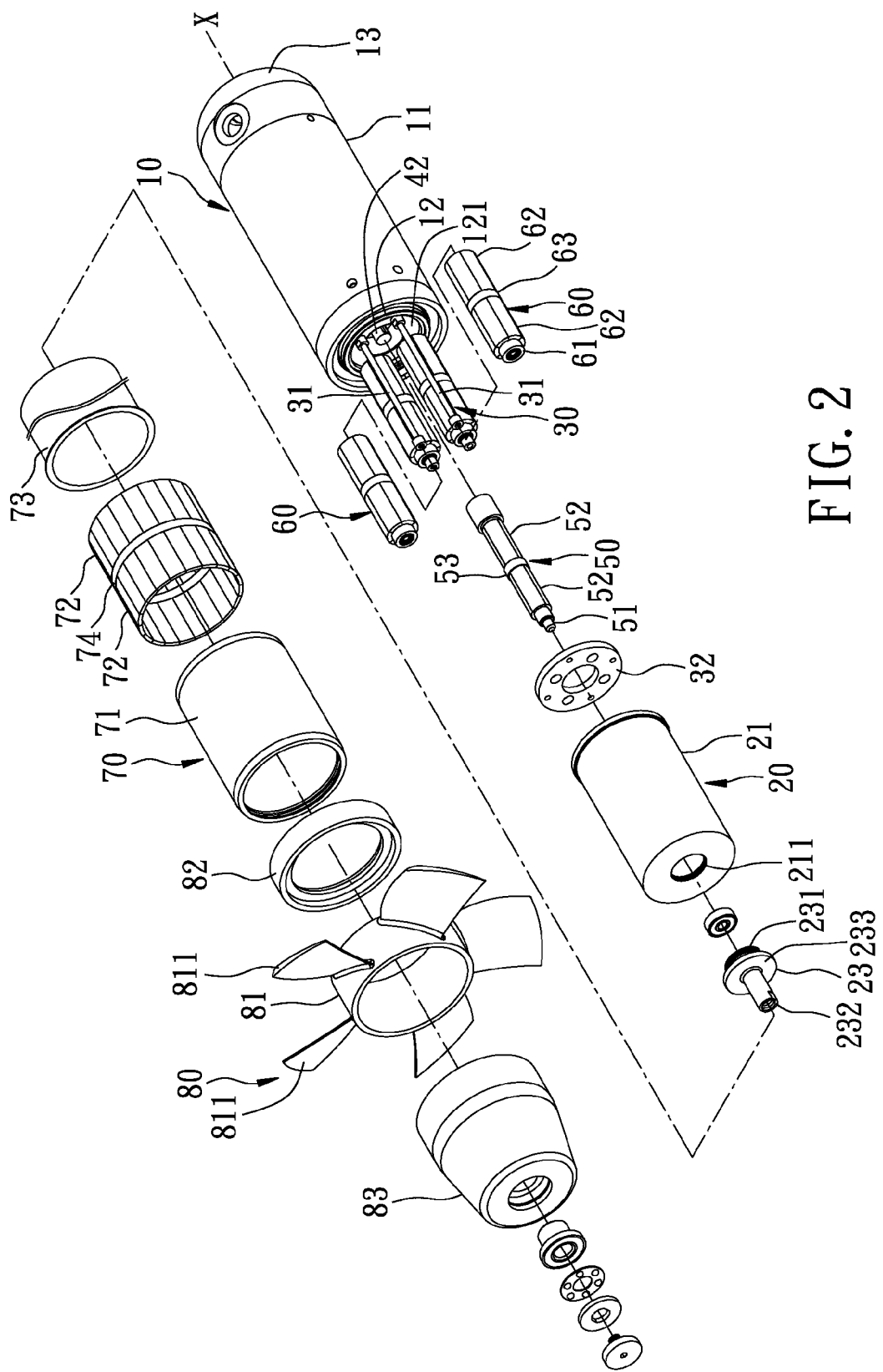
FIG. 2 is a fragmentary exploded perspective view of the preferred embodiment.
Figure 3:
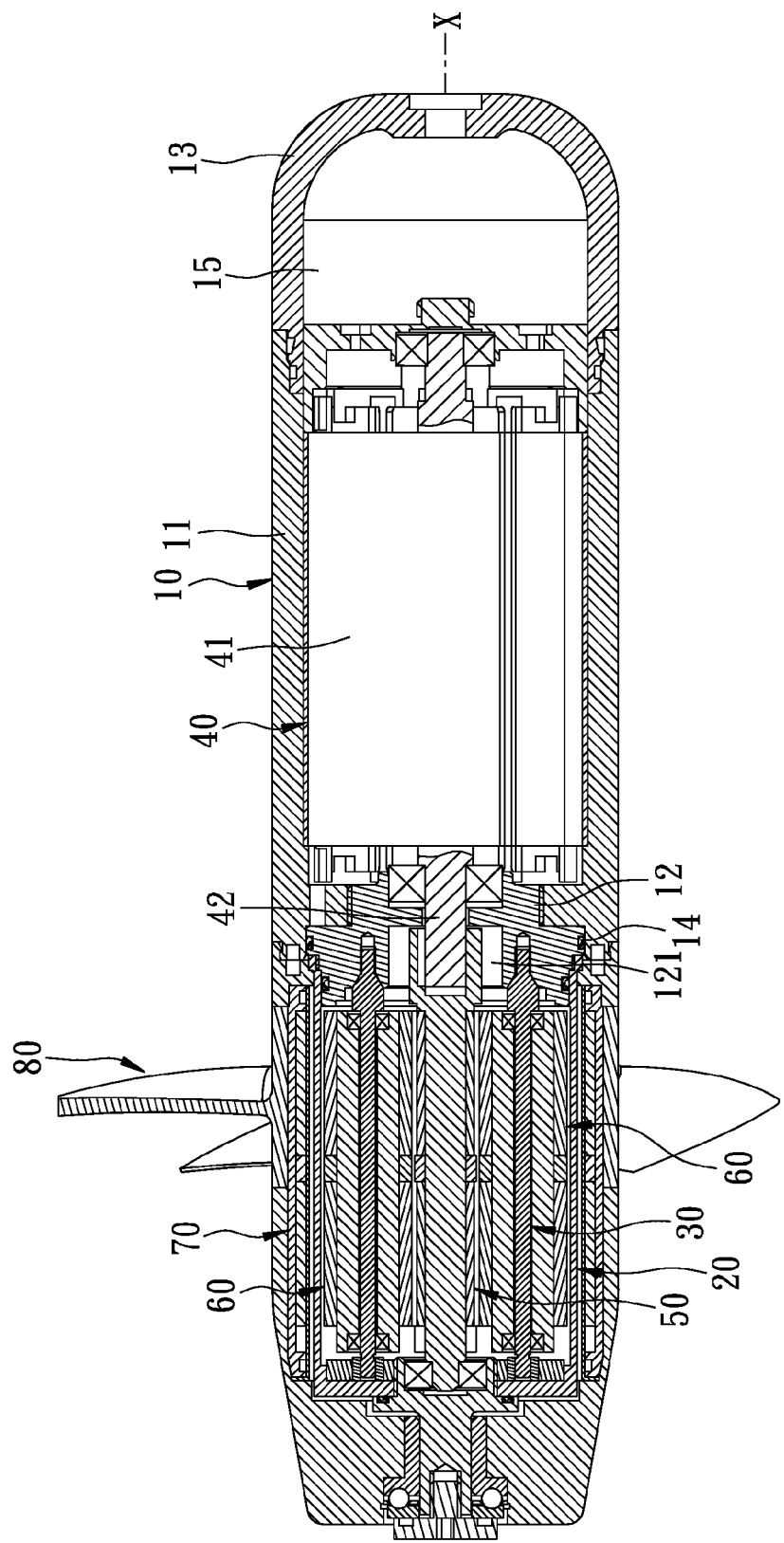
FIG. 3 is a sectional view of the preferred embodiment.
Figure 4:
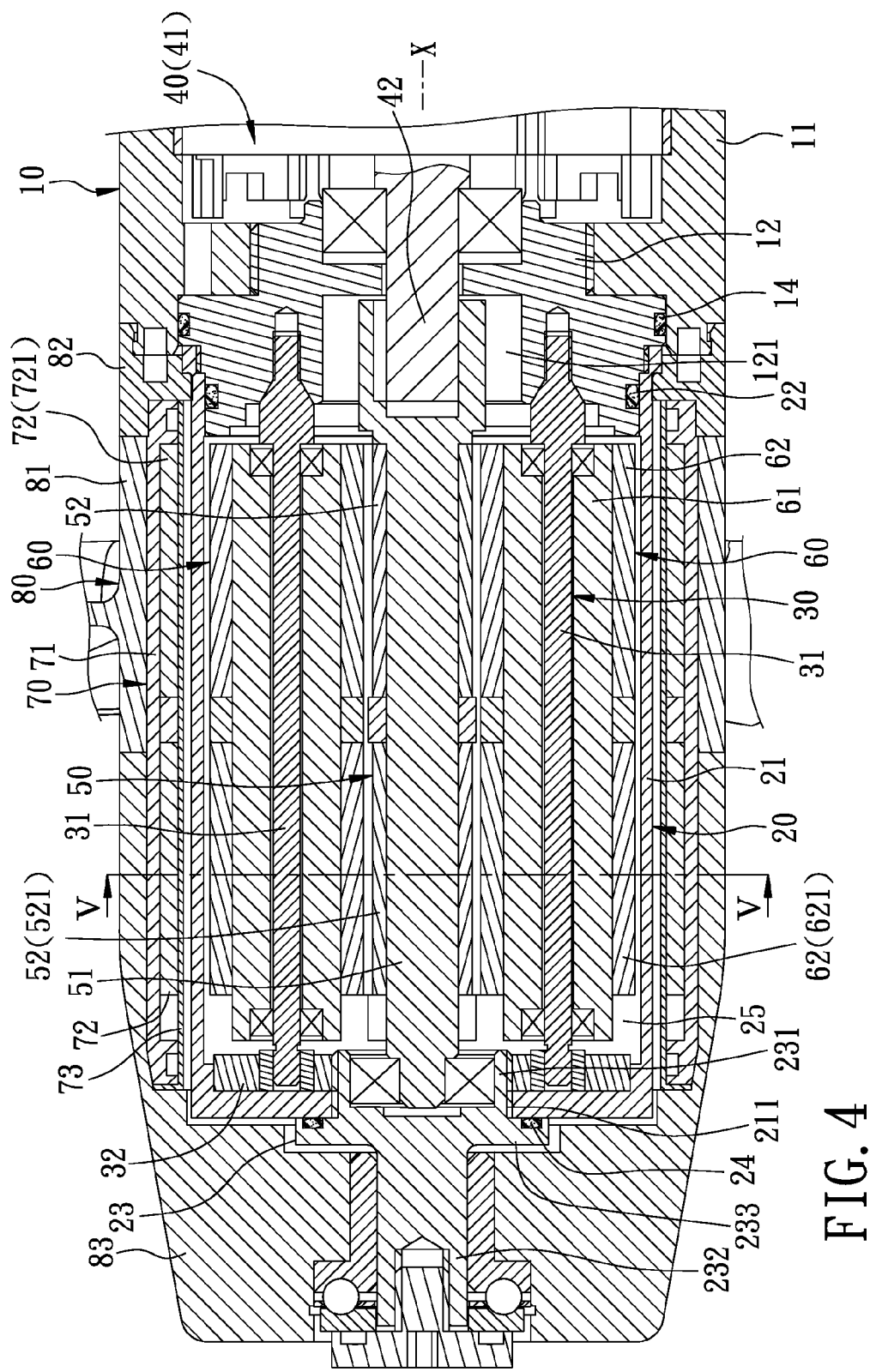
FIG. 4 is an enlarged fragmentary sectional view of the preferred embodiment.

As shown in FIGS. 1, 2, 3 and 4, a preferred embodiment of an underwater thruster according to the present invention comprises a housing unit 10, a cover unit 20, a supporting unit 30, a motor 40, a magnetic core unit 50, a plurality of magnetic intermediate units 60, a magnetic surrounding unit 70, and a propelling unit 80.

The housing unit 10 includes a housing body 11, a connecting member 12 formed with a first opening 121 and engaged threadedly with a rear end of the housing body 11, a head cap 13 connected to a front end of the housing body 11 opposite to the rear end along an axis (X), and a first waterproof washer 14 interposed water-tightly between the housing body 11 and the connecting member 12. The housing body 11 cooperates with the connecting member 12 and the head cap 13 to define a retaining space 15 in spatial communication with the first opening 121.

The cover unit 20 is connected to the housing unit 10, covers the first opening 121, and includes a cover body 21, second and third waterproof washers 22, 24, and a shaft component 23. The cover body 21 is engaged threadedly with the connecting member 12 of the housing unit 10, defines a protective space 25 therein, and is formed with a second opening 211 at one end thereof opposite to the connecting member 12 along the axis (X) and in spatial connection with the protective space 25. The second waterproof washer 22 is interposed water-tightly between the cover body 21 and the connecting member 12. The shaft component 23 has a flange portion 233 covering the second opening 211. The third waterproof washer 24 is interposed water-tightly between the cover body 21 and the flange portion 233 of the shaft component 23.

The shaft component 23 further has a tubular portion 231 extending from the flange portion 233 into the protective space 25 through the second opening 211, and a second shaft portion 232 extending from the flange portion 233 in a direction away from the tubular portion 231 along the axis (X).

The supporting unit 30 is disposed in the protective space 25, and includes a plurality of supporting shafts 31 angularly spaced apart with respect to the axis (X) and connected to the connecting member 12 along the direction of the axis (X), and a circular supporting plate 32 mounted onto the cover unit 21 and sleeved onto the tubular portion 231 of the shaft component 23. Each of the supporting shafts 31 has an end opposite to the connecting member 12 of the housing unit 10 in the direction of the axis (X) and connected to the supporting plate 32.

The motor 40 is disposed in the retaining space 15, and has a main body 41 in contact with the housing body 11, and a driving shaft 42 that extends through the first opening 121 along the axis (X). In this embodiment, the shaft component 23 is aligned with the driving shaft 42.

The magnetic core unit 50 is connected co-rotatably to the driving shaft 42, extends along the axis (X) into the protective space 25, and includes a rotatable shaft 51, a pair of axially spaced-apart driving magnet units 52 sleeved on the rotatable shaft 51, and a separating ring member 53. The rotatable shaft 51 has one end connected co-rotatably to the driving shaft 42 of the motor 40, and another end opposite to said one end of the rotatable shaft 51 inserted into and connected rotatably to the tubular portion 231 of the shaft component 23 of the cover unit 20. Each of the driving magnet units 52 has a plurality of angularly spaced-apart magnet blocks 521 mounted co-rotatably on the rotatable shaft 51 (see FIG. 5). The separating ring member 53 is sleeved on the rotatable shaft 51 and is interposed between the driving magnet units 52.

In this embodiment, the magnetic intermediate units are sleeved rotatably and respectively on the supporting shafts 31 of the supporting unit 30, are interposed between the connecting member 12 of the housing unit 10 and the supporting plate 32 of the supporting unit 30, are disposed to surround the magnetic core unit 50, are driven rotatably and magnetically by the magnetic core unit 50 when the magnetic core unit 50 rotates, and has a rotational speed lower than that of the magnetic core unit 50. In this embodiment, each of the magnetic intermediate units 60 includes an intermediate back iron member 61 sleeved rotatably on a respective one of the supporting shafts 31 of the supporting unit 30, a pair of axially spaced-apart intermediate magnet units 62, each of which has a plurality of magnet blocks 621 mounted co-rotatably on the intermediate back iron member 61 (see FIG. 5) and angularly spaced apart from each other with respect to a corresponding one of the supporting shafts 31, and a separating ring member 63 sleeved on the intermediate back iron member 61 and interposed between the intermediate magnet units 62.

Figure 5:
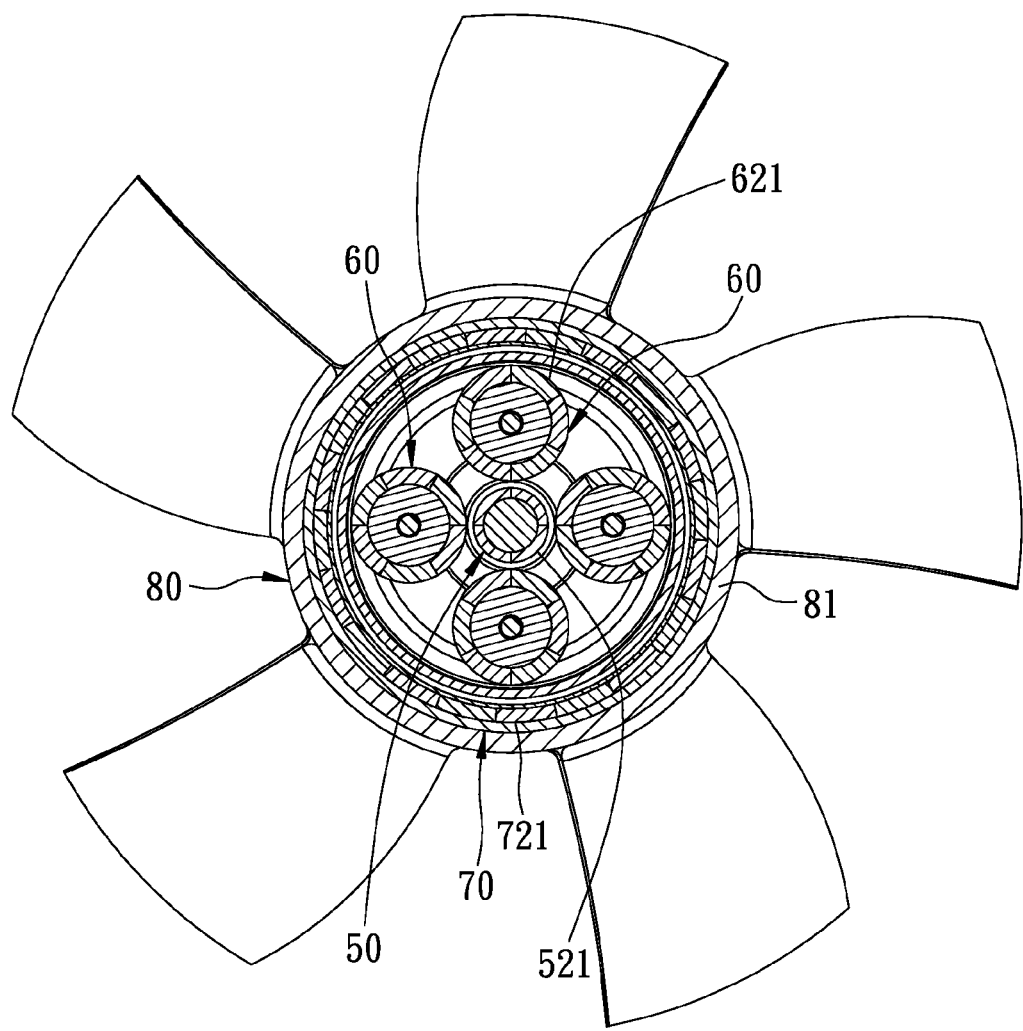
FIG. 5 is a sectional view of the preferred embodiment taken along line V-V in FIG. 4.

In this embodiment, each of the magnetic intermediate units 60 has an outer diameter larger than that of the magnetic core unit 50 (see FIG. 5).

The magnetic surrounding unit 70 is disposed to surround the cover unit 20, and is magnetically driven to rotate in response to a magnetic field induced by rotation of the magnetic intermediate units 60 at a rotational speed lower than that of the magnetic intermediate units 60. The magnetic surrounding unit includes: a surrounding back iron casing 71 surrounding the cover body 21 of the cover unit 20; a surrounding casing 73 connected to the surrounding back iron casing 71 and disposed between the surrounding back iron casing 71 and the cover body 21; a pair of axially spaced-apart surrounding magnet units 72, each of which has a plurality of angularly spaced-apart magnet blocks 721 mounted onto the surrounding back iron casing 71 (see FIG. 5) and disposed between the surrounding back iron casing 71 and the surrounding protective casing 73; and a separating ring member 74 disposed between the surrounding back iron casing 71 and the surrounding protective casing 73 and interposed between the surrounding magnet units 72.

The propelling unit 80 is connected co-rotatably to the magnetic surrounding unit 70, and includes a propeller member 81 having a plurality of angularly spaced-apart blades 811 that surround the axis (X), and sleeved fixedly on the surrounding back iron casing 71 of the magnetic surrounding unit 70, a ring member 82 interposed between the propeller member 81 and the housing body 11 and sleeved fixedly on a front portion of the surrounding back iron casing 71, and a rear end cap member 83 connected rotatably to the second shaft portion 232 of the shaft component 23 and surrounding a portion of the surrounding back iron casing 71 opposite to the ring member 82 along the axis (X).

Referring to FIG. 5, when the driving shaft 42 of the motor 40 (see FIG. 4) rotates and drives co-rotatably the magnetic core unit 50, the magnetic intermediate units 60 are driven rotatably and magnetically by virtue of the rotation of the magnetic core unit 50 in a rotational speed smaller than that of the magnetic core unit 50, and the magnetic surrounding unit 70 is driven rotatably and magnetically by virtue of the rotation of the magnetic intermediate units 60 in another rotational speed smaller than that of the magnetic intermediate units 60. Thus, the propeller member 81 of the propelling unit 80 which is sleeved fixedly onto the magnetic surrounding unit 70, is able to rotate with a relative low rotational speed and a high output torque.

Since transmission of driving energy from the driving shaft 42 to the propeller member 81 via the magnetic transmission mechanism involves no physical contact, the risk of overloading the thruster is reduced. Moreover, noise generated during operation of the thruster is reduced. Furthermore, such a multifunctional magnetic transmission mechanism can effectively reduce the size of the underwater thruster.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An underwater thruster comprising:
a housing unit defining a retaining space therein and having a first opening in spatial communication with said retaining space;
a cover unit connected water-tightly to said housing unit, covering said first opening, and defining a protective space therein that communicates spatially with said first opening;
a supporting unit connected to said housing unit and disposed in said protective space;
a motor disposed in said retaining space and having a driving shaft that extends through said first opening along an axis;
a magnetic core unit that is connected co-rotatably to said driving shaft and that extends along the axis into said protective space;
a plurality of magnetic intermediate units that are disposed on said supporting unit, that surround said magnetic core unit, and that are driven rotatably and magnetically by said magnetic core unit when said magnetic core unit rotates;
a magnetic surrounding unit that surrounds said cover unit, that is driven rotatably and magnetically by said magnetic intermediate units when said magnetic intermediate units rotate, and that has a rotational speed lower than that of said magnetic core unit; and
a propelling unit connected co-rotatably to said magnetic surrounding unit, and having a plurality of angularly spaced-apart blades that surround the axis.

2. The underwater thruster as claimed in claim 1, wherein said housing unit includes a housing body, a connecting member interconnecting said housing body and said cover unit, formed with said first opening and connected to said supporting unit, and a first waterproof washer interposed water-tightly between said housing body and said connecting member.

3. The underwater thruster as claimed in claim 2, wherein said supporting unit includes a plurality of angularly spaced-apart supporting shafts extending from said connecting member of said housing unit along the direction of the axis, said magnetic intermediate units being disposed rotatably and respectively on said supporting shafts.

4. The underwater thruster as claimed in claim 3, wherein each of said magnetic intermediate units includes an intermediate back iron member disposed rotatably on a respective one of said supporting shafts of said supporting unit, and at least one intermediate magnet unit mounted co-rotatably on said intermediate back iron member.

5. The underwater thruster as claimed in claim 3, wherein said supporting unit further includes a supporting plate that is disposed in said protective space and that is mounted to said cover unit, each of said supporting shafts having an end that is opposite to said connecting member of said housing unit in the direction of the axis and that is connected to said supporting plate, said magnetic intermediate units being interposed between said connecting member and said supporting plate.

6. The underwater thruster as claimed in claim 5, wherein said cover unit includes:
- a cover body surrounding said magnetic intermediate units, connected to said housing unit and formed with a second opening in one end thereof opposite to said connecting member along the axis;
- a second waterproof washer interposed between said cover body and said connecting member of said housing unit;
- a shaft component covering said second opening and having a tubular portion that extends into said protective space through said second opening, said supporting plate of said supporting unit being sleeved on said tubular portion; and
- a third waterproof washer interposed water-tightly between said cover body and said shaft component.

7. The underwater thruster as claimed in claim 6, wherein said magnetic core unit includes:
- a rotatable shaft having one end that is connected co-rotatably to said driving shaft of said motor, and an opposite end that is connected rotatably to said tubular portion of said shaft component of said cover unit; and
- at least one driving magnet unit mounted co-rotatably on said rotatable shaft.

8. The underwater thruster as claimed in claim 6, wherein said magnetic surrounding unit includes:
- a surrounding back iron casing surrounding said cover body of said cover unit;
- a surrounding protective casing connected to said surrounding back iron casing and disposed between said surrounding back iron casing and said cover body; and
- at least one surrounding magnet unit mounted to said surrounding back iron casing and disposed between said surrounding back iron casing and said surrounding protective casing.

9. The underwater thruster as claimed on claim 8, wherein:
said shaft component of said cover unit further has a second shaft portion opposite to said tubular portion along the axis;
said propelling unit includes a propeller member sleeved fixedly on said surrounding back iron casing of said magnetic surrounding unit and including said blades, a ring member interposed between said propeller member and said housing body and sleeved fixedly on a front portion of said surrounding back iron casing, and an end cap member connected rotatably to said second shaft portion of said shaft component and surrounding a portion of said surrounding back iron casing opposite to said ring member along the axis.

10. The underwater thruster as claimed on claim 1, wherein each of said magnetic intermediate units has an outer diameter larger than that of said magnetic core unit.

* * * * *